United States Patent
Kang et al.

(10) Patent No.: US 11,897,058 B2
(45) Date of Patent: Feb. 13, 2024

(54) WELD GROOVE FORMING METHOD AND HOLLOW ARTICLE

(71) Applicants: Samsung Engineering Co., Ltd., Seoul (KR); Hyundai Robotics Co., Ltd., Daegu (KR)

(72) Inventors: Sung Gi Kang, Yongin-si (KR); Young Nam Ahn, Yongin-si (KR)

(73) Assignees: SAMSUNG ENGINEERING CO., LTD., Seoul (KR); HYUNDAI ROBOTICS CO., LTD., Daegu (KR)

( * ) Notice: Subject to any disclaimer, the term of this patent is extended or adjusted under 35 U.S.C. 154(b) by 0 days.

(21) Appl. No.: 17/869,066

(22) Filed: Jul. 20, 2022

(65) Prior Publication Data

US 2023/0241724 A1 Aug. 3, 2023

(30) Foreign Application Priority Data

Jan. 28, 2022 (KR) .................. 10-2022-0013595

(51) Int. Cl.
*B23K 33/00* (2006.01)
*B23K 31/12* (2006.01)
(Continued)

(52) U.S. Cl.
CPC .............. *B23K 33/006* (2013.01); *B23B 1/00* (2013.01); *B23B 5/167* (2013.01); *B23K 31/12* (2013.01); *B23B 2260/128* (2013.01)

(58) Field of Classification Search
CPC ........ B23K 33/006; B23K 31/12; B23K 9/02; B23K 31/027; B23K 33/00;
(Continued)

(56) References Cited

U.S. PATENT DOCUMENTS

| 4,219,370 | A |   | 8/1980 | Hoaglin et al. |
| 4,724,975 | A | * | 2/1988 | Leventry ............. B23K 33/006 220/4.12 |

(Continued)

FOREIGN PATENT DOCUMENTS

| CN | 204771186 U | * | 11/2015 | |
| CN | 110744181 A | * | 2/2020 | ............. B23K 9/235 |

(Continued)

OTHER PUBLICATIONS

Substantive Examination Report, dated Dec. 14, 2022, issued in corresponding Saudi Application No. 122431130, with English language translation, 15 pps.

(Continued)

*Primary Examiner* — Sara Addisu
(74) *Attorney, Agent, or Firm* — Panitch Schwarze Belisario & Nadel LLP

(57) ABSTRACT

The present disclosure relates to a weld groove forming method and a hollow article. The weld groove forming method may include: (S110) determining whether a side end of a pipe may be processed into a form of a true circle by using a sensor robot; and (S220) forming a weld groove in a form of a true circle at the side end of the pipe by using an automatic beveling machine when the sensor robot determines that the side end of the pipe may be processed into a form of a true circle in the step (S110).

11 Claims, 6 Drawing Sheets

(51) Int. Cl.
B23B 1/00 (2006.01)
B23B 5/16 (2006.01)

(58) Field of Classification Search
CPC ............ B23K 2101/04; B23K 2101/06; B23Q
17/2452; B23Q 17/2471; B23Q 17/20;
B23Q 17/248; B23B 5/167; B23B 5/16;
B23B 1/00; B23B 3/26; B23B 2260/128;
G01N 21/00; F16L 13/02
See application file for complete search history.

(56) References Cited

U.S. PATENT DOCUMENTS

| | | | | |
|---|---|---|---|---|
| 5,894,771 | A * | 4/1999 | Braun | B23D 21/04 |
| | | | | 82/47 |
| 5,952,109 | A * | 9/1999 | Nagami | B23K 33/00 |
| | | | | 428/599 |
| 6,109,151 | A * | 8/2000 | Braun | B23Q 17/006 |
| | | | | 82/134 |
| 8,733,619 | B2 * | 5/2014 | Lalam | B23K 9/0282 |
| | | | | 219/101 |
| 8,935,973 | B2 * | 1/2015 | Leblanc | B23B 5/167 |
| | | | | 82/123 |
| 10,376,963 | B2 * | 8/2019 | Giberman | B23B 5/162 |
| 10,710,163 | B2 * | 7/2020 | Silveira E Silva | B23Q 17/24 |
| 10,788,147 | B2 | 9/2020 | Bonel et al. | |
| 2007/0216159 | A1 * | 9/2007 | Yoshihara | F16L 13/02 |
| | | | | 285/288.1 |
| 2013/0026148 | A1 * | 1/2013 | Aoyama | B23K 37/00 |
| | | | | 901/42 |
| 2013/0048619 | A1 * | 2/2013 | Doyle | B23K 9/0286 |
| | | | | 219/122 |
| 2015/0090361 | A1 * | 4/2015 | Tajika | B21C 37/0815 |
| | | | | 228/101 |
| 2017/0209950 | A1 * | 7/2017 | Nishimura | B23K 9/0203 |
| 2018/0031152 | A1 * | 2/2018 | Rajagopalan | B23K 9/0282 |
| 2019/0210137 | A1 * | 7/2019 | Hasegawa | B23K 9/23 |
| 2021/0016440 | A1 * | 1/2021 | Cassidy, II | B25J 9/1664 |
| 2022/0090711 | A1 * | 3/2022 | Zhou | B23K 9/0286 |
| 2022/0134464 | A1 * | 5/2022 | Jiao | B25J 9/1664 |
| | | | | 219/124.34 |

FOREIGN PATENT DOCUMENTS

| | | | | | |
|---|---|---|---|---|---|
| JP | 61007067 | A | * | 1/1986 | ........... B23K 31/027 |
| JP | 61132270 | A | * | 6/1986 | ........... B23K 33/006 |
| JP | H0639661 | A | | 2/1994 | |
| JP | 3170720 | B2 | * | 5/2001 | |
| JP | 2001340966 | A | | 12/2001 | |
| JP | 2010190797 | A | | 9/2010 | |
| JP | 2011218393 | A | * | 11/2011 | |
| JP | 2012206163 | A | * | 10/2012 | |
| JP | 6279062 | B1 | * | 2/2018 | ............ B21C 37/08 |
| KR | 20030092703 | A | * | 3/2006 | ............ F16B 13/124 |
| KR | 101051071 | B1 | | 7/2011 | |
| KR | 101990580 | B1 | | 6/2019 | |
| WO | 2009075525 | A2 | | 6/2009 | |

OTHER PUBLICATIONS

Welding Joint—Wikipedia, en.wikipedia.org_wiki_Welding_joint, 4 pps., downloaded 2023-0216.
Intellectual Property Office Request for the Submission of an Opinion issued by the Korean Patent Office dated Aug. 2, 2023 in corresponding Appln. No. KR 10-2022-0013595 (English Translation; 10 Pages).

* cited by examiner

WELD GROOVE FORMING METHOD AND HOLLOW ARTICLE

CROSS-REFERENCE TO RELATED APPLICATION

This application is based on and claims priority under 35 U.S.C. § 119 to Korean Patent Application No. 10-2022-0013595, filed on Jan. 28, 2022, in the Korean Intellectual Property Office, the disclosure of which is incorporated by reference herein in its entirety.

BACKGROUND

1. Field

The present disclosure relates to a weld groove forming method and a hollow article. More specifically, the present disclosure relates to a weld groove forming method capable of providing a weld groove for which an automated welding can be performed and a hollow article having the weld groove.

2. Description of the Related Art

Oil & gas plants, industrial plants, buildings, etc., include complex pipe facilities.

In order to install a pipe facility in an oil & gas plant, an industrial plant, a building, etc., first, a plurality of pipe spools which will constitute a pipe facility are prefabricated in a pipe spool fabrication shop. Then, a plurality of prefabricated pipe spools is moved to a site such as an oil & gas plant, an industrial plant, a building, etc., and the plurality of pipe spools is connected to each other in the site.

In this manner, a plurality of pipe spools connected to each other is installed in a steel frame or civil structure that constitute an oil & gas plant, an industrial plant, a building, etc., by using a support and the like, and the plurality of pipe spools connected to each other is finally connected to a stationary equipment such as a column, vessel, tank, or a heat exchanger, or to a rotating machinery such as a compressor, or a pump, and the entire pipe facility is constructed in an oil & gas plant, industrial plant, building, etc.

On the other hand, each of the pipe spools that constitute an oil & gas plant, industrial plant, building, etc., has a different form and size. For this reason, pipe spools are a typical small quantity batch product, and automation of manufacture has been difficult. Accordingly, in the past, an automated device could only be applied in some manufacturing processes that produce pipe spools of a simple shape, and pipe spools of a complicated shape were manufactured by manually cutting, processing, and moving members such as pipes, and by manually welding pipes and fitting members in each workshop.

In addition, in the past, multiple tasks such as drawing management, member management, and inspection task essential for fabricating pipe spools have still been processed based on paper works, and each manufacturing process required a responsible personnel.

In addition, welding is needed in order to connect a pipe to another piper or a pipe to a hollow connection member such as a fitting member, and because welding operation has been done manually or semi-automatically, not only a lot of time and manpower have been required in a welding operation, but also there have been issues of welding defects.

SUMMARY

An embodiment of the present disclosure provides a weld groove forming method capable of providing a weld groove for which an automatic welding can be performed.

Another embodiment of the present disclosure provides a hollow article including a weld groove for which an automatic welding can be performed.

Additional aspects will be set forth in part in the description which follows and, in part, will be apparent from the description, or may be learned by practice of the presented embodiments of the disclosure.

According to an aspect, a weld groove forming method is provided, the weld groove forming method including:

(S110) determining whether a side end of a pipe may be processed into a form of a true circle by using a sensor robot; and (S220) forming a weld groove in a form of a true circle at the side end of the pipe by using an automatic beveling machine when the sensor robot determines that the side end of the pipe may be processed into a form of a true circle in the step (S110).

The step (S110) may include: (S110-1) scanning the side end of the pipe to obtain an measured image in a form of an annular ring by using the sensor robot; (S110-2) overlapping the measured image with a predetermined virtual image in a form of an annular ring and also in a form of a true circle and determining whether the thickness portion of the virtual image is completely included in the thickness portion of the measured image, and also the ratio of the thickness of the virtual image to the average thickness of the measured image satisfies a reference value by using the sensor robot; and (S110-3) determining that the side end of the pipe may be processed into a form of a true circle by using the sensor robot, when the thickness portion of the virtual image is completely included in the thickness portion of the measured image, and also the ratio of the thickness of the virtual image to the average thickness of the measured image satisfies the reference value in the step (S110-2).

In the step (S110-3), the reference value may be 87.5% to 95%.

The step (S120) may be performed by cutting the inner wall, side end and outer wall of the pipe.

The step (S120) may include: (S120-1) slantly cutting the outer wall of the pipe from a first point relatively far from the side end of the pipe to a second point relatively close to the side end of the pipe, so that a thickness at the first point relatively far from the side end of the pipe is relatively thick, and a thickness at the second point relatively close to the side end of the pipe is relatively thin; (S120-2) slantly cutting the outer wall of the pipe which went through the step (S120-1) from the second point relatively close to the side end of the pipe to a third point relatively closer to the side end of the pipe, so that a thickness at the second point relatively close to the side end of the pipe is relatively thick, and a thickness at the third point relatively closer to the side end of the pipe is relatively thin; (S120-3) slantly cutting the outer wall of the pipe which went through the step (S120-2) from the third point relatively closer to the side end of the pipe to a fourth point relatively even more closer to the side end of the pipe, so that a thickness at the third point relatively closer to the side end of the pipe is relatively thick, and a thickness at the fourth point relatively even more closer to the side end of the pipe is relatively thin; (S120-4) cutting the outer wall of the pipe which went through the step (S120-3) from the fourth point relatively even more closer to the side end of the pipe to the side end of the pipe, so that a thickness is constant from the fourth point relatively even more closer to the side end of the pipe to the side end of the pipe; (S120-5) vertically cutting the side end of the pipe which went through the step (S120-4) by a predetermined thickness; (S120-6) cutting the inner wall of the pipe which went through the step (S120-5) from the side end of the pipe to a fifth point separated from the side end of the pipe, so that a thickness is constant from the side end of the pipe to the fifth point separated from the side end of the pipe; and (S120-7) slantly cutting the inner wall of the pipe which went through the step (S120-6) from the fifth point separated from the side end of the pipe to a sixth point relatively far from the side end of the pipe, so that a thickness at the fifth point separated from the side end of the pipe is relatively thin, and a thickness at the sixth point relatively far from the side end of the pipe is relatively thick.

The step (S120-1) may be a step of cutting the outer wall of the pipe so that a thickness decreases at a constant rate from the first point to the second point.

The step (S120-2) may be a step of cutting the outer wall of the pipe so that a thickness decreases at a constant rate from the second point to the third point.

The step (S120-3) may be a step of cutting the outer wall of the pipe so that a thickness decreases according to a predetermined radius of curvature from the third point to the fourth point.

The step (S120-4) may be a step of cutting the outer wall of the pipe so that a horizontal distance from the fourth point to the side end of the pipe is about 2 mm to 3 mm.

The step (S120-5) may be a step of cutting the outer wall of the pipe so that a thickness between the inner wall and the outer wall of the pipe is about 1 mm to 2 mm.

The step (S120-7) may be a step of cutting the outer wall of the pipe so that a thickness increases at a constant rate from the fifth point to the sixth point.

The first point may be positioned relatively far from the side end of the pipe than the sixth point, and the second point may be positioned relatively closer to the side end of the pipe than the fifth point.

The steps (S120-1) to (S120-7) may be configured to cut the outer wall of the pipe so that a thickness between the inner wall and the outer wall of the pipe at the second point may be 87.5% to 95% with respect to 100% of the thickness between the inner wall and the outer wall of the pipe at the first point.

The weld groove forming method may further include scanning the weld groove formed in the step (S120) to determine circularity by using the sensor robot.

The weld groove forming method may further include: (S210) determining whether a side end of a hollow connection member may be processed into a form of a true circle by using a sensor robot; and (S220) forming a weld groove in a form of a true circle at the side end of the hollow connection member by using an automatic beveling machine, when the sensor robot determines that the side end of the hollow connection member may be processed into a form of a true circle in the step (S210).

The step (S110), the step (S120), the step (S210), and the step (S220) may be performed automatically.

According to another aspect, a hollow article is provided, which is a hollow article having a weld groove in a form of a true circle,
wherein the weld groove includes:
a 1-1 curved surface, a 1-2 curved surface, a 1-3 curved surface and a 1-4 curved surface formed on the outer wall of the hollow article, the 1-1 curved surface being slantly formed so that a thickness at a first point relatively far from a side end of the hollow article is relatively thick, and a thickness at a second point relatively close to the side end of the hollow article is relatively thin; the 1-2 curved surface being slantly formed so that a thickness at the second point relatively close to the side end of the hollow article is relatively thick, and a thickness at a third point relatively closer to the side end of the hollow article is relatively thin; the 1-3 curved surface being slantly formed so that a thickness at the third point relatively closer to the side end of the hollow article is relatively thick, and a thickness at a fourth point relatively even more closer to the side end of the hollow article is relatively thin; and the 1-4 curved surface being formed so that a thickness from the fourth point relatively even more closer to the side end of the hollow article to the side end of the hollow article is constant;

a vertical surface formed on the side end of the hollow article, the vertical surface being formed between the inner wall and the outer wall;

and a 2-1 curved surface and a 2-2 curved surface formed on the inner wall of the hollow article, the 2-1 curved surface being formed so that a thickness is constant from the side end of the hollow article to a fifth point separated from the side end of the hollow article; and the 2-2 curved surface being slantly formed so that a fifth point separated from the side end of the hollow article is relatively thin, and a thickness at a sixth point relatively far from the side end of the hollow article is relatively thick.

The 1-1 curved surface may be formed so that a thickness decreases at a constant rate from the first point to the second point.

The 1-2 curved surface may be formed so that a thickness decreases at a constant rate from the second point to the third point.

The 1-3 curved surface may be formed so that a thickness decreases according to a predetermined radius of curvature from the third point to the fourth point.

A length of the 1-4 curved surface may be 2 mm to 3 mm.

A thickness of a vertical surface formed at the side end of the hollow article may be 1 mm to 2 mm.

The 2-2 curved surface may be formed so that a thickness increases at a constant rate from the fifth point to the sixth point.

The first point may be positioned relatively far from the side end of the hollow article than the sixth point, and the second point may be relatively closer to the side end of the hollow article than the fifth point.

A thickness between the inner wall and the outer wall of the hollow article at the second point may be 87.5% to 95% with respect to 100% of the thickness between the inner wall and the outer wall of the hollow article at the first point.

A weld groove forming method and a hollow article according to an embodiment of the present disclosure provides a weld groove for which an automated welding can be performed so that welding time and manpower requirements are reduced, and welding defects are prevented.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
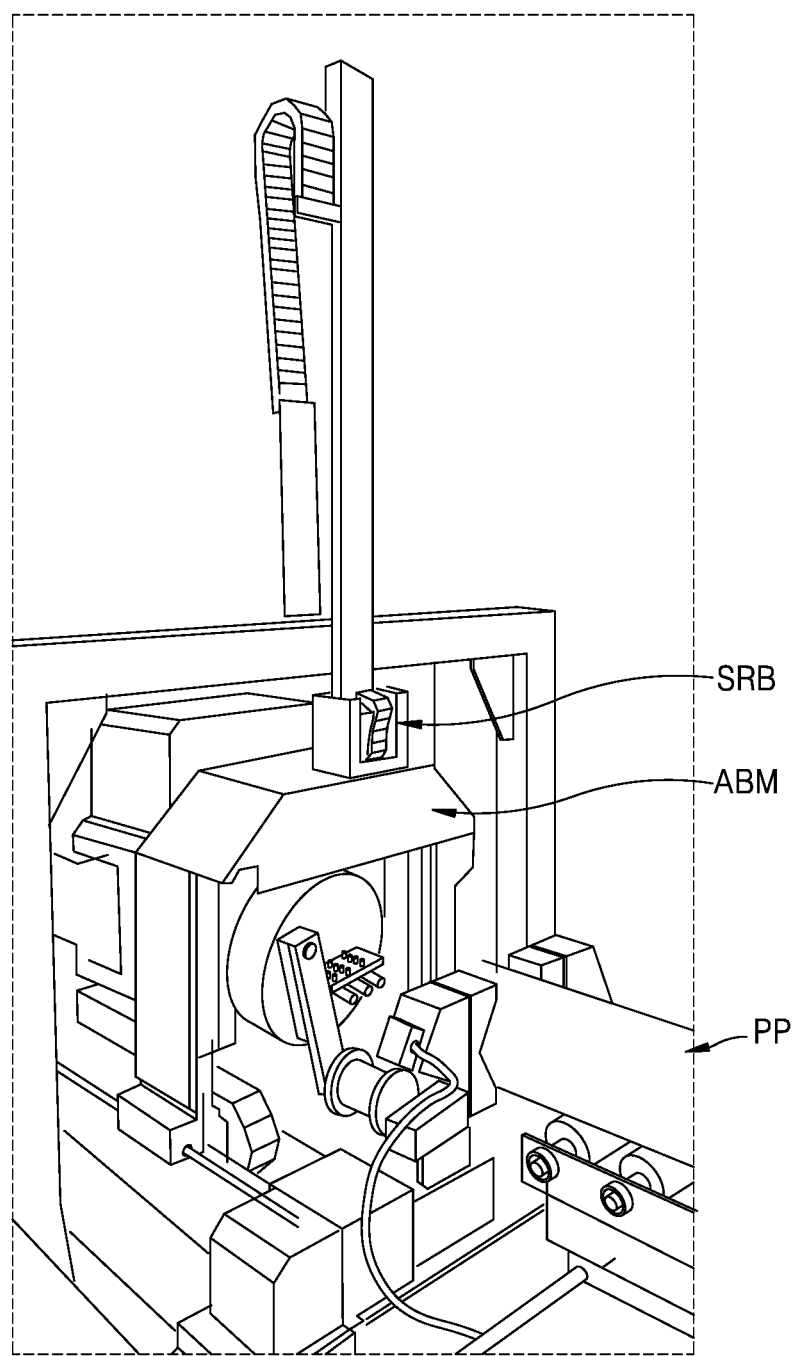
FIG. 1 is a diagram schematically illustrating a method of forming a weld groove in a form of a true circle by using a sensor robot and an automatic beveling machine according to a weld groove forming method according to an embodiment of the present disclosure.

Reference will now be made in detail to embodiments, embodiments of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of at least one of the associated listed items. Expressions such as "at least one of," when preceding a list of elements, modify the entire list of elements and do not modify the individual elements of the list.

Hereinafter, a weld groove forming method and a hollow article according to an embodiment of the present disclosure will be described in detail with reference to the drawings.

As used herein, the term "weld groove" refers to a processed portion formed between base materials (i.e., pipes and hollow connection members) for an efficient welding. Specifically, "weld groove" is a concept collectively referring to all cut surfaces formed at an inner wall, side end, and outer wall of one end or both ends of each base material.

As used herein, the term "hollow article" refers to an article having a penetration hole extending from one end to the other end.

As used herein, the term "side end of a hollow article" refers to an end portion on an entrance side or an exit side of a penetration hole among end portions of a hollow article.

As used herein, the term "sensor robot (vision sensor)" refers to a device having a function of scanning a side end of the hollow article in 2D or 3D, a function of storing the scanned image of the hollow article as a measured image, a function of forming a virtual image in a form of an annular ring, a function of overlapping the virtual image with the measured image and figuring out whether the thickness portion of the virtual image is completely included in the thickness portion of the measured image, and also the ratio of the thickness of the virtual image to the average thickness of the measured image satisfies a reference value, a function of determining that the side end of the hollow article may be processed into a form of a true circle when the thickness portion of the virtual image is completely included in the thickness portion of the measured image, and also the ratio of the thickness of the virtual image to the average thickness of the measured image satisfies a reference value, a function of determining the side end of the hollow article may not be processed into a form of a true circle when the thickness portion of the virtual image is not completely included in the thickness portion of the measured image, or the ratio of the thickness of the virtual image to the average thickness of the measured image does not satisfy a reference value, a function of transmitting a beveling initiation signal to an automatic beveling machine, and a function of continuously measuring the distance between the beveling blade of the automatic beveling machine and a to-be-beveled part of the hollow article and continuously transmitting the measured value to the automatic beveling machine. Furthermore, the virtual image has a feature of having a predetermined annular ring size (i.e., a distance between the inner wall and the outer wall).

As used herein, the term "automatic beveling machine" refers to a device forming a weld groove by beveling a portion including a side end of a hollow article in conjunction with a sensor robot.

In addition, as used herein, the term "central axis of a hollow article" means a line extending in a direction parallel to the direction in which the penetration hole extends and also passing through the center of the penetration hole.

As used herein, the term "point of a pipe, a hollow connection member, or a hollow article" refers to an arbitrary point present on an arbitrary vertical line perpendicular to the central axis of a pipe, a hollow connection member or a hollow article.

As used herein, the term "distance between the any two points of a pipe, a hollow connection member, or a hollow article" refers to a distance between vertical lines orthogonal to the central axis of each member passing through each point.

As used herein, the term "root welding" refers to the first welding performed on a weld groove without a tack welding.

As used herein, the term "filling and cap welding" refers to the finishing welding performed on a weld groove after a root welding.

Figure 2:
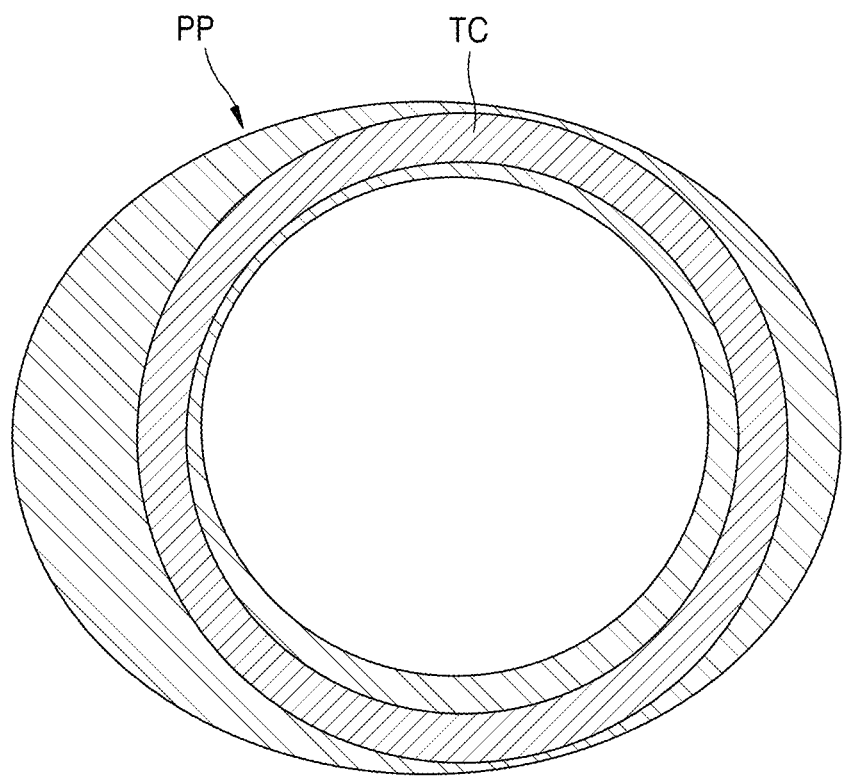
FIG. 2 is a diagram for explaining a method of determining whether a side end of a pipe may be processed into a form of a true circle by using a sensor robot according to a weld groove forming method according to an embodiment of the present disclosure.

FIG. 1 is a diagram schematically illustrating a method of forming a weld groove in a form of a true circle on a pipe (PP) by using a sensor robot (SRB) and an automatic beveling machine (ABM) according to a weld groove forming method according to an embodiment of the present disclosure, and FIG. 2 is a diagram for explaining a method of determining whether a side end of a pipe (PP) may be processed into a form of a true circle by using a sensor robot (SRB) according to a weld groove forming method according to an embodiment of the present disclosure.

Referring to FIGS. 1 and 2, a method of forming a weld groove according to an embodiment of the present disclosure includes determining (S110) whether the side end of the pipe (PP) may be processed into a form of a true circle by using a sensor robot (SRB).

The step (S110) may include: (S110-1) scanning the side end of the pipe (PP) to obtain an measured image in a form of an annular ring by using the sensor robot (SRB); (S110-2) overlapping the measured image with a predetermined virtual image in a form of an annular ring and also in a form of a true circle and determining whether the thickness portion of the virtual image is completely included in the thickness portion of the measured image, and also the ratio of the thickness of the virtual image to the average thickness of the measured image satisfies a reference value by using the sensor robot (SRB); and (S110-3) determining that the side end of the pipe (PP) may be processed into a form of a true circle by using the sensor robot (SRB), when the thickness portion of the virtual image is completely included in the thickness portion of the measured image, and also the ratio of the thickness of the virtual image to the average thickness of the measured image satisfies the reference value in the step (S110-2). In FIG. 2, the form of a side end of a pipe (PP) corresponds to a measured image, and the portion marked as a true circle (TC) may correspond to the virtual image.

In the step (S110-3), a reference value of the ratio of a thickness of the virtual image to an average thickness of the measured image may be 87.5% to 95%. Here, "thickness" means a distance between the inner wall and the outer wall of a virtual image in a form of an annular ring or a measured image in a form of an annular ring.

In addition, the weld groove forming method includes forming a weld groove in a form of a true circle at a side end of a pipe (PP) by using an automatic beveling machine (ABM), when the sensor robot (SRB) determines that the side end of pipe (PP) may be processed into a form of a true circle in the step (S110).

Specifically, when a sensor robot (SRB) determines that a side end of a pipe (PP) may be processed into a form of a true circle, the sensor robot (SRB) may transmit an beveling initiation signal to an automatic beveling machine (ABM) through a control unit (not shown) or directly. In this regard, an automatic beveling machine (ABM) may form a weld groove in a form of a true circle according to a predetermined sequence at a precise location of a side end of a pipe (PP).

Figure 3:
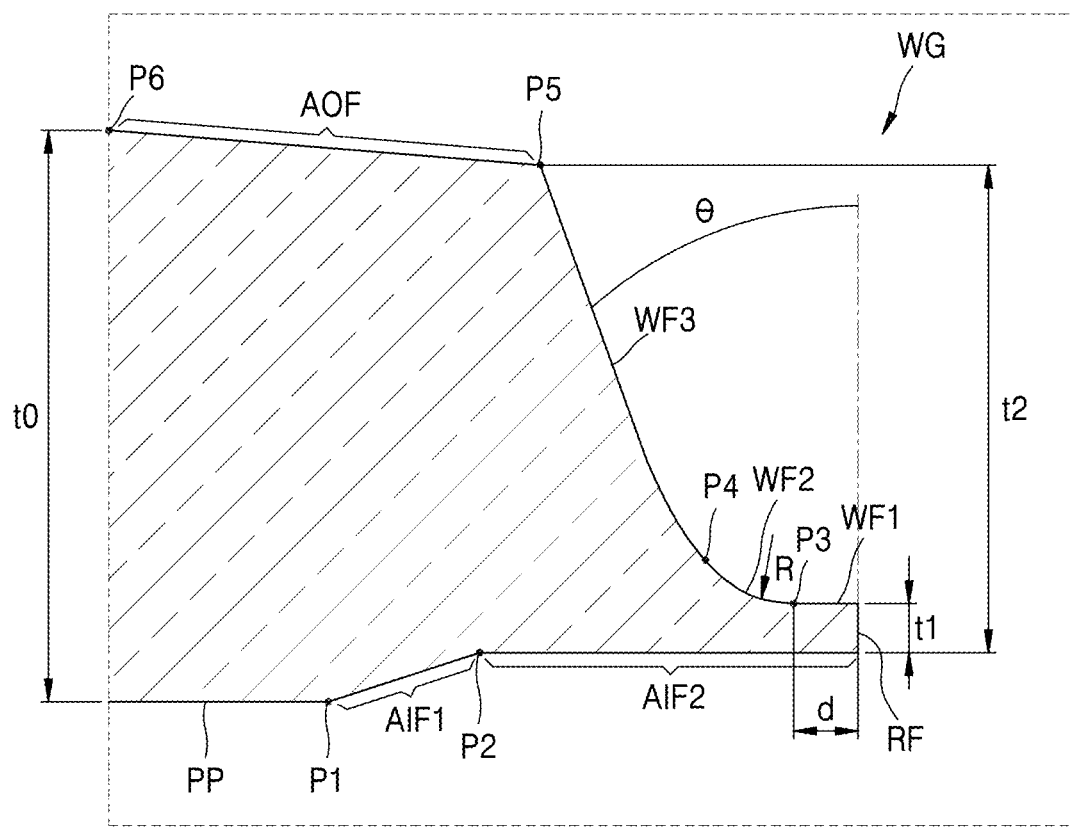
FIG. 3 is a diagram for explaining a method of forming a weld groove in a form of a true circle on a pipe according to a weld groove forming method according to an embodiment of the present disclosure.

FIG. 3 is a diagram for explaining a method of forming a weld groove in a form of a true circle on a pipe (PP) according to a weld groove forming method according to an embodiment of the present disclosure.

Referring to FIG. 3, the step (S120) may be performed by cutting an inner wall, a side end, and an outer wall of a pipe (PP) by using an automatic beveling machine (ABM).

Specifically, the step (S120) may include: (S120-1) slantly cutting the outer wall of the pipe (PP) from a first point (P1) relatively far from the side end of the pipe (PP) to a second point (P2) relatively close to the side end of the pipe (PP), so that a thickness at the first point (P1) relatively far from the side end of the pipe (PP) is relatively thick, and a thickness at the second point (P2) relatively close to the side end of the pipe (PP) is relatively thin. As a result, an additional outer face (AOF) may be formed. This additional outer face (AOF) minimizes the outer off-set of a pipe (PP) and a connection member (CM) welded thereto, so that welding beads formed between the two members may be homogeneously and smoothly connected. Here, "thickness" means a distance between an inner wall and an outer wall of a pipe (PP). Specifically, the step (S120-1) may be a step of cutting the outer wall of the pipe (PP) so that a thickness decreases at a constant rate from the first point (P1) to the second point (P2).

In addition, the step (S120) may further include (S120-2) slantly cutting the outer wall of the pipe (PP) which went through the step (S120-1) from the second point (P2) relatively close to the side end of the pipe (PP) to a third point (P3) relatively closer to the side end of the pipe (PP), so that a thickness at the second point (P2) relatively close to the side end of the pipe (PP) is relatively thick, and a thickness at the third point (P3) relatively closer to the side end of the pipe (PP) is relatively thin. As a result, a first weld face (WF1) may be formed. For example, the step (S120-2) may be a step of cutting the outer wall of the pipe (PP) so that a thickness decreases at a constant rate from the second point (P2) to the third point (P3). In addition, a slope ($\theta$) of the first weld surface (WF1) may be 20° based on a vertical line extended vertically from the root surface (RF), which will be described later, but the present disclosure is not limited thereto.

In addition, the step (S120) may further include (S120-3) slantly cutting the outer wall of the pipe (PP) which went through the step (S120-2) from the third point (P3) relatively closer to the side end of the pipe (PP) to a fourth point (P4) relatively even more closer to the side end of the pipe (PP), so that a thickness at the third point (P3) relatively closer to the side end of the pipe (PP) is relatively thick, and a thickness at the fourth point (P4) relatively even more closer to the side end of the pipe (PP) is relatively thin. As a result, a second weld face (WF2) may be formed. For example, the step (S120-3) may be a step of cutting the outer wall of the pipe (PP) so that a thickness decrease according to a predetermined radius of curvature (R) from the third point (P3) to the fourth point (P4). As the weld groove forming method includes the step (S120-3), not only the processing of a weld groove (WG) may become easier but also quality of the welding may be improved. In addition, the step (S120) may further include (S120-4) cutting the outer wall of the pipe (PP) which went through the step (S120-3) from the fourth point (P4) relatively even more closer to the side end of the pipe (PP) to the side end of the pipe (PP), so that a thickness is constant from the fourth point (P4) relatively even more closer to the side end of the pipe (PP) to the side end of the pipe (PP). As a result, a third weld face (WF3) may be formed. Specifically, the step (S120-4) may be a step of cutting the outer wall of the pipe (PP) so that a horizontal distance (d) from the fourth point (P4) to the side end of the pipe (PP) is about 2 mm to 3 mm.

Here, "horizontal distance (d)" refers to a distance between the vertical line extended from a side end of a pipe (PP) and an arbitrary vertical line positioned on the opposite side (i.e., the side of the fourth point (P4)). When the horizontal distance (d) is within the range, when an automatic root welding is performed, the root face (RF) melts well so that a back bead is well-formed, and when a filling and cap welding is performed, a burn through may be prevented at a third weld face (WF3), which will be described later. This will be described later with reference to FIG. 6. In addition, the step (S120) may further include (S120-5) vertically cutting the side end of the pipe which went through the step (S120-4) by a predetermined thickness. As a result, a root face (RF) may be formed.

Specifically, the step (S120-5) may be a step of cutting the outer wall of the pipe (PP) so that a thickness (t1) between the inner wall and the outer wall of the pipe (PP) is about 1 mm to 2 mm. When the thickness (t1) is within the range, when an automatic root welding is performed, a back bead is well-formed without a burn through, and welding at the root face (RF) may be performed smoothly. This will be described later with reference to FIG. 6.

In addition, the step (S120) may further include (S120-6) cutting the inner wall of the pipe (PP) which went through the step (S120-5) from the side end of the pipe (PP) (this means the newly formed side end of the pipe (PP) after cutting the existing side end of the pipe (PP)) to a fifth point (P5) separated from the side end of the pipe (PP), so that a thickness is constant from the side end of the pipe (PP) to the fifth point (P5) separated from the side end of the pipe (PP). As a result, an additional inner face (AIF1) may be formed.

In addition, the step (S120) may further include (S120-7) slantly cutting the inner wall of the pipe (PP) which went through the step (S120-6) from the fifth point (P5) separated from the side end of the pipe (PP) to a sixth point (P6) relatively far from the side end of the pipe (PP), so that a thickness at the fifth point (P5) separated from the side end of the pipe (PP) is relatively thin, and a thickness at the sixth point (P6) relatively far from the side end of the pipe (PP) is relatively thick. As a result, an additional inner face (AIF2) may be formed. For example, the step (S120-7) may be a step of cutting the outer wall of the pipe (PP) so that a thickness increases at a constant rate from the fifth point (P5) to the sixth point (P6).

The additional inner face (AIF1) formed in the step (S120-6) and the additional inner face (AIF2) formed in the step (S120-7) reduces fluid resistance so that a fluid may flow smoothly when a fluid flows through the pipe (PP), and prevents in advance pipe damages such as cracks that occur when fluid pressure is locally concentrated.

On the other hand, the first point (P1) may be positioned relatively far from the side end of the pipe (PP) than the sixth point, and the second point (P2) may be positioned relatively closer to the side end of the pipe (PP) than the fifth point (P5). In this case, the steps (S120-1) to (S120-7) may be configured to cut the outer wall of the pipe (PP) so that a thickness (t2) between the inner wall and the outer wall of the pipe (PP) at the second point (P2) may be 87.5% to 95% with respect to 100% of the thickness (t0) between the inner wall and the outer wall of the pipe (PP) at the first point (P1) When the thickness (t2) is within the range, an excellent welding joint strength may be secured.

The steps (S120-1) to (S120-7) may be performed in the above-described order or may be performed in the reverse order.

The weld groove forming method may further include (S130) scanning the weld groove formed in the step (S120) to determine circularity by using the sensor robot (SRB). For example, the step (S103) may further include (S130-1) scanning the weld groove formed in the step (S120) to get a measured image in a form of an annular ring by using the sensor robot (SRB), (S130-2) figuring out whether there is a virtual image in a form of a true circle that completely overlaps the measured image by using the sensor robot (SRB), and (S130-3) determining that the weld groove was processed into a form of a true circle by using the sensor robot (SRB) when there is a virtual image in a form of a true circle that completely overlaps the measured image in the step (S103-2).

Figure 4:
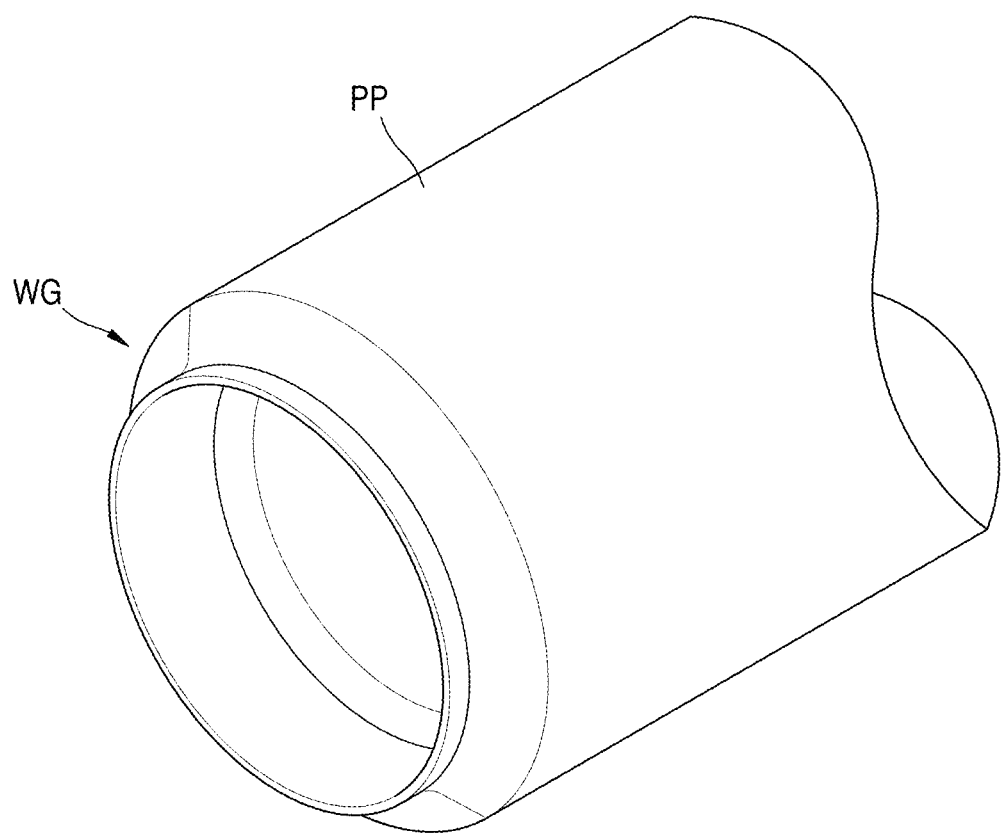
FIG. 4 is a diagram illustrating a weld groove in a form of a true circle formed at a side end of a pipe according to a weld groove forming method according to an embodiment of the present disclosure.

FIG. 4 is a diagram illustrating a weld groove in a form of a true circle formed at a side end of a pipe (PP) according to a weld groove forming method according to an embodiment of the present disclosure.

Referring to FIG. 4, it can be seen that the weld groove formed by cutting the inner wall, the side end, and the outer wall at the side end of the pipe (PP) and the adjacent portion thereof is formed in a true circle shape along the circumference of the pipe (PP).

The weld groove forming method may further include: (S210) determining whether a side end of a hollow connection member (CM) may be processed into a form of a true circle by using a sensor robot (SRB); and (S220) forming a weld groove in a form of a true circle at the side end of the hollow connection member (CM) by using an automatic beveling machine (ABM), when the sensor robot (SRB) determines that the side end of the hollow connection member (CM) may be processed into a form of a true circle in the step (S210).

The weld groove forming method may further include (S230) scanning the weld groove formed in the step (S220) to determine circularity by using the sensor robot (SRB).

The step (S210), the step (S220), and the step (S230), may be the same with the step (S110), the step (S120), and the step (S130), respectively, except that a processing target is changed from a pipe (PP) to a hollow connection member (CM). Therefore, a detailed description of the step (S210), the step (S220), and the step (S230) will be omitted herein.

Figure 5:
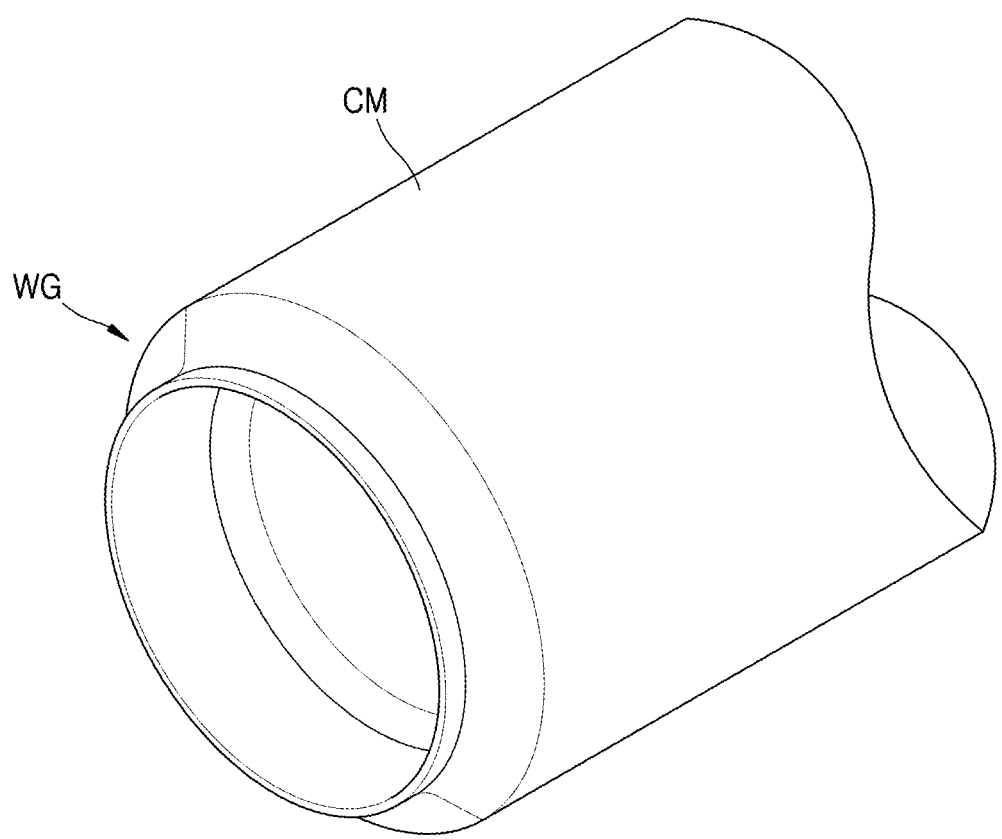
FIG. 5 is a diagram illustrating a weld groove in a form of a true circle formed at a hollow connection member manufactured according to a weld groove forming method according to an embodiment of the present disclosure.

FIG. 5 is a diagram illustrating a weld groove in a form of a true circle formed at a hollow connection member (CM) manufactured according to a weld groove forming method according to an embodiment of the present disclosure.

Referring to FIG. 5, it can be seen that the weld groove formed by cutting the inner wall, the side end, and the outer wall at the side end of the hollow connection member (CM) and the adjacent portion thereof is formed in a true circle shape along the circumference of the hollow connection member (CM).

Figure 6:
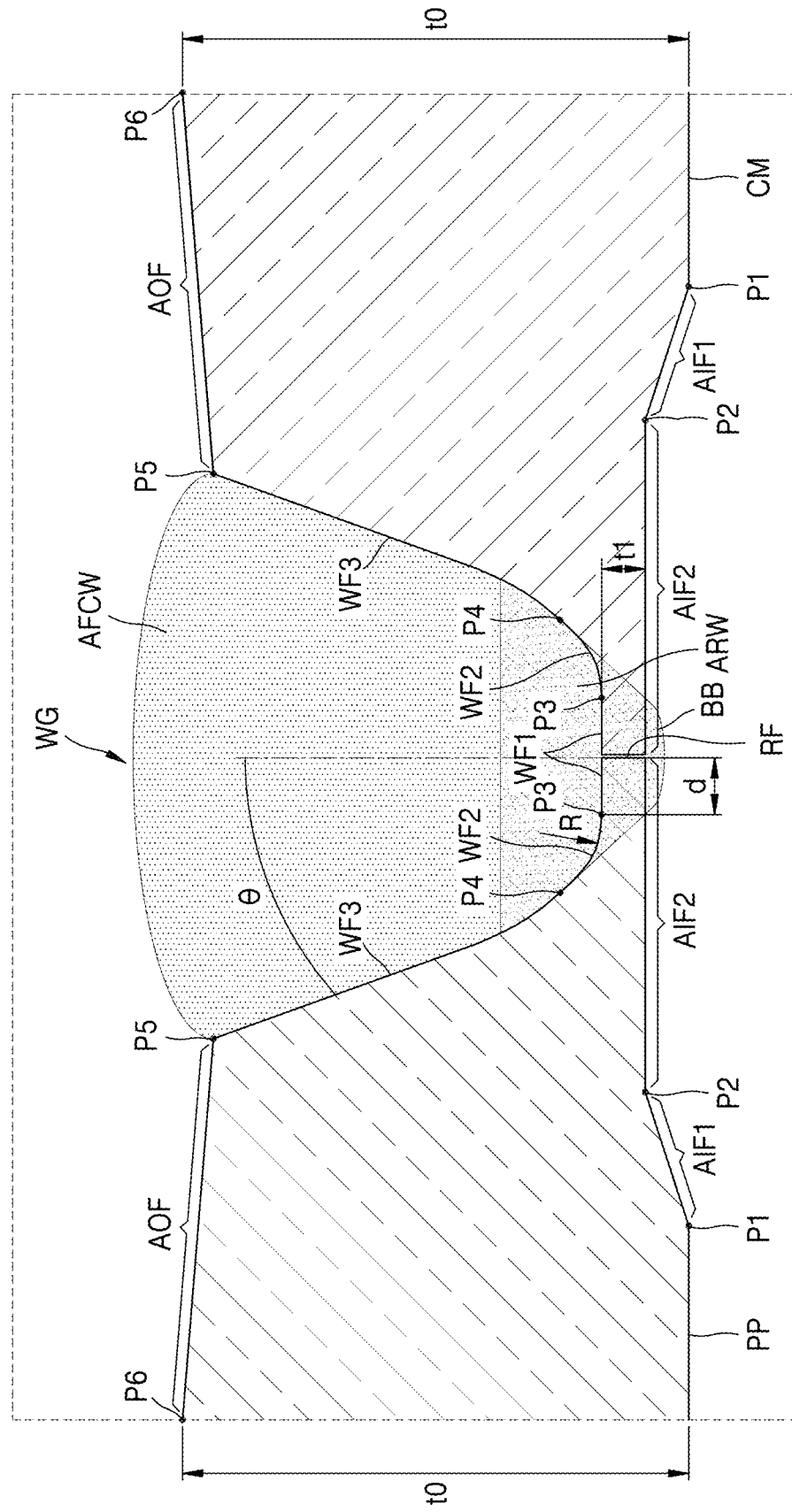
FIG. 6 is a diagram explaining a method of forming a weld groove in a pipe and a hollow connecting member according to a method of forming a welding groove according to an embodiment of the present invention, respectively, and welding the formed true circular weld grooves to each other.

FIG. 6 is a diagram explaining a method of forming a weld groove in a pipe (PP) and a hollow connecting member (CM) according to a method of forming a welding groove according to an embodiment of the present invention, respectively, and welding the formed true circular weld grooves to each other.

Referring to FIG. 6, a root face (RF) of a weld groove of a pipe (PP) formed through the step (S110) and the step (S120) and a root face (RF) of a weld groove of a hollow connection member (CM) formed through the step (S210) and the step (S220) may be aligned with each other, and an automatic root welding (gas tungsten welding; GTW) and automatic filling and cap welding (gas metal welding; GMW) may be performed sequentially on the weld faces (WF1, WF2, and WF3) of two members.

The automatic root welding may be relatively small quantity welding, and the automatic filling and cap welding may be relatively large quantity welding.

When a thickness (t1) shown in FIG. 6 is 1 mm to 2 mm, when an automatic root welding is performed, the root faces (RF) of the two members may be adequately melted, and a back bead may be well-formed without a burn through. On the other hand, when a thickness (t1) is less than 1 mm, when an automatic root welding is performed, the root faces (RF) of the two members may be excessively melted, and a gap (or a burn through) may be formed between the root faces (RF) of two members. In addition, when a thickness (t1) exceeds 2 mm, when an automatic root welding is performed, the root faces (RF) of the two members may not be sufficiently melted, so that a back bead, which is formed only when melt of a welding material fully penetrates between root faces (RF) of two members, may not be formed.

In addition, when a horizontal distance (d) shown in FIG. 6 is 2 mm to 3 mm, when an automatic root welding is performed, the root faces (RF) of the two members may be adequately melted, and a back bead may be well-formed. On the other hand, when a horizontal distance (d) is less than 2 mm, when an automatic root welding is performed, the root faces (RF) of the two members may not be sufficiently melted, and a back bead, which is formed only when melt of a welding material fully penetrates between root faces (RF) of two members, may not be formed. In addition, when a horizontal distance (d) exceeds 3 mm, when an automatic filling and cap welding is performed, a portion of the third weld faces (WF3) of the two members (i.e., the portion not welded when an automatic root welding is performed) may be excessively melted, and a burn through may occur at the third weld faces of two members.

The step (S110), the step (S120), the step (S130), the step (S210), the step (S220), the automatic root welding, and the automatic filling and cap welding may be automatically performed without an intervention of a manual operation due to individual actions and interactions of a sensor robot (SRB), an automatic beveling machine (ABM), an automatic root welder (not shown) and an automatic filling and cap welder (not shown).

Hereinafter, a hollow article according to an embodiment of the present disclosure will be described in detail.

A hollow article according to an embodiment of the present disclosure may have a weld groove in a form of a true circle.

In addition, the weld groove may include a 1-1 curved surface, 1-2 curved surface, 1-3 curved surface and 1-4 curved surface formed on the outer wall of the hollow article in this order.

The 1-1 curved surface may be slantly formed so that a thickness at a first point (P1) relatively far from a side end of the hollow article is relatively thick, and a thickness at a second point (P2) relatively close to the side end of the hollow article is relatively thin (this corresponds to AOF of FIG. 3). For example, the 1-1 curved surface may be formed so that a thickness decreases at a constant rate from the first point (P1) to the second point (P2).

The 1-2 curved surface may be slantly formed so that a thickness at the second point (P2) relatively close to the side end of the hollow article is relatively thick, and a thickness at a third point (P3) relatively closer to the side end of the hollow article is relatively thin (this corresponds to WF1 of FIG. 3). For example, the 1-2 curved surface may be formed so that a thickness decreases at a constant rate from the second point (P2) to the third point (P3). In addition, a slope (δ) of the 1-2 curved surface may be 20° based on a vertical line which is vertically extended from the vertical surface, but the present disclosure is not limited thereto.

The 1-3 curved surface may be slantly formed so that a thickness at the third point (P3) relatively closer to the side end of the hollow article is relatively thick, and a thickness at a fourth point (P4) relatively even more closer to the side end of the hollow article is relatively thin (this corresponds to WF2 of FIG. 3). For example, the 1-3 curved surface may be formed so that a thickness decreases according to a predetermined radius of curvature (R) from the third point (P3) to the fourth point (P4). For example, the radius of curvature (R) may be 5 mm, but the present disclosure is not limited thereto. As the weld groove includes the 1-3 curved surface, not only the processing of the weld groove may become easier, but also quality of the welding may improve.

The 1-4 curved surface may be formed so that a thickness from the fourth point (P4) relatively even more closer to the side end of the hollow article to the side end of the hollow article is constant (this corresponds to WF3 of FIG. 3). For example, a length of the 1-4 curved surface may be 2 mm to 3 mm (this corresponds to the horizontal distance (d) of FIG. 3). When a length of the 1-4 curved surface is 2 mm to 3 mm, when an automatic root welding is performed, the vertical surface is adequately melted, so that a back bead may be well-formed. On the other hand, when a length of the 1-4 curved surface is less than 2 mm, when an automatic root welding is performed, the vertical surface is not sufficiently melted, so that a back bead, which is formed only when melt of a welding material fully penetrates between the vertical surface and a corresponding vertical surface of another member welded thereto, may not be formed. In addition, when a length of the 1-4 curved surface exceeds 3 mm, when an automatic filling and cap welding is performed, a portion of the 1-4 curved surface (i.e., the portion not welded when an automatic root welding is performed) may be excessively melted, and a hole may form at the 1-4 curved surface.

In addition, a side end of the hollow article may include a vertical surface.

The vertical surface may be formed between the inner wall and the outer wall of the hollow article (this corresponds to RF in FIG. 3). For example, a thickness (this corresponds to t1 in FIG. 3) of the vertical surface formed at a side end of the hollow article may be 1 mm to 2 mm. When a thickness of vertical surface is 1 mm to 2 mm, when an automatic root welding is performed, the vertical surface is adequately melted, and thus a back bead may be well-formed. On the other hand, when a thickness of the vertical surface is less than 1 mm, when an automatic root welding is performed, the vertical surface may excessively melt so that a gap may form between the vertical surface and a corresponding vertical surface of another member welded thereto. In addition, when a thickness of the vertical surface exceeds 2 mm, when an automatic root welding is performed, the vertical surface is not sufficiently melted, so that a back bead, which is formed only when melt of a welding material fully penetrates between the vertical surface and a corresponding vertical surface of another member welded thereto, may not be formed.

The weld groove may include a 2-1 curved surface and a 2-2 curved surface formed on the inner wall of the hollow article.

The 2-1 curved surface may be formed so that a thickness is constant from the side end of the hollow article to a fifth point (P5) separated from the side end of the hollow article (this corresponds to AIF1 in FIG. 3).

The 2-2 curved surface may be slantly formed so that a fifth point (P5) separated from the side end of the hollow article is relatively thin, and a thickness at a sixth point (P6) relatively far from the side end of the hollow article is relatively thick (this corresponds to AIF2 of FIG. 3). For example, the 2-2 curved surface may be formed so that a thickness increases at a constant rate from the fifth point (P5) to the sixth point (P6).

The first point (P1) may be positioned relatively far from the side end of the hollow article than the sixth point (P6), and the second point (P2) may be relatively closer to the side end of the hollow article than the fifth point (P5). In this case, a thickness between the inner wall and the outer wall of the hollow article at the second point (P2) (this corresponding to t2 in FIG. 3) may be 87.5% to 95% with respect to 100% of the thickness between the inner wall and the outer wall of the hollow article at the first point (P1). When a thickness (t2) is within the range, an excellent welding joint strength may be secured.

The hollow article may be manufactured according to a weld groove forming method according to an embodiment of the present disclosure described in detail above.

The hollow article may be a pipe or a hollow connection member.

The hollow connection member may include a fitting member such as an elbow, a reducer, or a tee, or a flange member.

The method of forming a weld groove according to an embodiment of the present disclosure having the configuration as described above may provide a true circular weld groove having a special structure on which automatic welding may be performed. The present inventors developed a weld groove forming method which allows an automatic welding of a hollow article, and a hollow article which is manufactured according to the method and has a true circular weld groove of a special structure after striving hard to reduce welding costs by shortening welding time and reducing manpower required for welding, and to improve welding quality. In addition, the present inventors found that an automated welding is impossible for the existing weld grooves (including the weld joints disclosed at https://en.wikipedia.org/wiki/Welding_joint).

The present disclosure has been described with reference to the drawings, but the drawings are only given as examples, and it will be appreciated by those of ordinary skill in the art that a variety of modifications and equivalent other embodiments are possible. Accordingly, the true scope of the present disclosure should be determined by the technical idea of the appended claims.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A weld groove forming method comprising:
   (S110) determining whether a side end of a pipe is configured to be processed into a form of a true circle by using a sensor robot; and
   (S220) forming a weld groove in a form of the true circle at the side end of the pipe by using an automatic beveling machine when the sensor robot determines that the side end of the pipe is configured to be processed into a form of the true circle in the step (S110),
   wherein the sensor robot is configured to (1) scan a side end of the hollow article in 2D or 3D, (2) store the scanned image of the hollow article as a measured image, (3) form a virtual image in a form of an annular ring, (4) overlap the virtual image with the measured image and determine whether the thickness portion of the virtual image is completely included in the thickness portion of the measured image, and also the thickness of the virtual image is in a range of 87.5% to 95% of an average thickness of the measured image, (5) determine that the side end of the hollow article is configured to be processed into a form of a true circle when the thickness portion of the virtual image is completely included in the thickness portion of the measured image, and also the thickness of the virtual image is in the range of 87.5% to 95% of the average thickness of the measured image, (6) determine the side end of the hollow article is not configured to be processed into a form of a true circle when the thickness portion of the virtual image is not completely included in the thickness portion of the measured image, or the thickness of the virtual image is in the range of 87.5% to 95% of the average thickness of the measured image, (7) transmit a beveling initiation signal to an automatic beveling machine, and (8) continuously measure the distance between the beveling blade of the automatic beveling machine and a to-be-beveled part of the hollow article and continuously transmit the measured value to the automatic beveling machine,
   wherein the step (S110) comprises:
   (S110-1) scanning the side end of the pipe to obtain a measured image in a form of an annular ring by using the sensor robot;
   (S110-2) overlapping the measured image with a predetermined virtual image in a form of an annular ring and also in a form of the true circle and determining whether the thickness portion of the virtual image is completely included in the thickness portion of the measured image, and also the thickness of the virtual image is in the range of 87.5% to 95% of the average thickness of the measured image by using the sensor robot; and
   (S110-3) determining that the side end of the pipe is configured to be processed into a form of the true circle by using the sensor robot, when the thickness portion of the virtual image is completely included in the thickness portion of the measured image, and also the thickness of the virtual image is in the range of 87.5% to 95% of the average thickness of the measured image in the step (S110-2).

2. The weld groove forming method of claim 1, wherein the step (S120) is performed by cutting the inner wall, side end and outer wall of the pipe.

3. The weld groove forming method of claim 2, wherein the step (S120) comprises:
   (S120-1) slantly cutting the outer wall of the pipe from a first point far from the side end of the pipe to a second point close to the side end of the pipe, so that a thickness at the first point far from the side end of the pipe is thick, and a thickness at the second point close to the side end of the pipe is thin;
   (S120-2) slantly cutting the outer wall of the pipe which went through the step (S120-1) from the second point far from the side end of the pipe to a third point close to the side end of the pipe, so that a thickness at the second point far from the side end of the pipe is thick, and a thickness at the third point close to the side end of the pipe is relatively thin;
   (S120-3) slantly cutting the outer wall of the pipe which went through the step (S120-2) from the third point far from the side end of the pipe to a fourth point close to the side end of the pipe, so that a thickness at the third point far from the side end of the pipe is thick, and a thickness at the fourth point close to the side end of the pipe is thin;
   (S120-4) cutting the outer wall of the pipe which went through the step (S120-3) from the fourth point close to the side end of the pipe to the side end of the pipe, so that a thickness is constant from the fourth point close to the side end of the pipe to the side end of the pipe;
   (S120-5) vertically cutting the side end of the pipe which went through the step (S120-4) by a predetermined thickness;
   (S120-6) cutting the inner wall of the pipe which went through the step (S120-5) from the side end of the pipe to a fifth point spaced apart from the side end of the pipe, so that a thickness is constant from the side end of the pipe to the fifth point spaced apart from the side end of the pipe; and
   (S120-7) slantly cutting the inner wall of the pipe which went through the step (S120-6) from the fifth point close to the side end of the pipe to a sixth point far from the side end of the pipe, so that a thickness at the fifth point close to the side end of the pipe is thin, and a thickness at the sixth point far from the side end of the pipe is thick.

4. The weld groove forming method of claim 3, wherein the step (S120-1) is a step of cutting the outer wall of the pipe so that a thickness decreases at a constant rate from the first point to the second point,
wherein the step (S120-2) is a step of cutting the outer wall of the pipe so that a thickness decreases at a constant rate from the second point to the third point,
wherein the step (S120-3) is a step of cutting the outer wall of the pipe so that a thickness decrease according to a predetermined radius of curvature from the third point to the fourth point,
wherein the step (S120-7) is a step of cutting the outer wall of the pipe so that a thickness increases at a constant rate from the fifth point to the sixth point.

5. The weld groove forming method of claim 3, wherein the step (S120-4) is a step of cutting the outer wall of the pipe so that a horizontal distance from the fourth point to the side end of the pipe is about 2 mm to 3 mm.

6. The weld groove forming method of claim 3, wherein the step (S120-5) is a step of cutting the outer wall of the pipe so that a thickness between the inner wall and the outer wall is about 1 mm to 2 mm.

7. The weld groove forming method of claim 3, wherein the first point is positioned far from the side end of the pipe than the sixth point, and the second point is positioned close to the side end of the pipe than the fifth point.

8. The weld groove forming method of claim 7, wherein the steps (S120-1) to (S120-7) are configured to cut the outer wall of the pipe so that a thickness between the inner wall and the outer wall of the pipe at the second point is 87.5% to 95% with respect to 100% of the thickness between the inner wall and the outer wall of the pipe at the first point.

9. The weld groove forming method of claim 1, wherein the method further comprises (S130) scanning the weld groove formed in the step (S120) to determine circularity by using the sensor robot.

10. The weld groove forming method of claim 1, wherein, the weld groove forming method further comprises:
(S210) determining whether a side end of a hollow connection member is configured to be processed into a form of a true circle by using a sensor robot; and
(S220) forming a weld groove in a form of a true circle at the side end of the hollow connection member by using an automatic beveling machine, when the sensor robot determines that the side end of the hollow connection member is configured to be processed into a form of a true circle in the step (S210).

11. The weld groove forming method of claim 10, wherein the step (S110), the step (S120), the step (S210), and the step (S220) are automatically performed.

* * * * *